United States Patent
Hayman

[19]

[11] Patent Number: 5,993,250
[45] Date of Patent: Nov. 30, 1999

[54] JUMPER CABLES WITH AUTOMATIC SAFETY SWITCHING

[76] Inventor: Richard W. Hayman, 15 Arlive Ct., Rockville, Md. 20854

[21] Appl. No.: 09/094,661

[22] Filed: Jun. 15, 1998

[51] Int. Cl.$^6$ ............................................. H01R 11/00
[52] U.S. Cl. ................................. 439/504; 320/105
[58] Field of Search .............................. 439/504; 320/105

[56] References Cited

U.S. PATENT DOCUMENTS

| | | | |
|---|---|---|---|
| 4,006,952 | 2/1977 | Puckett | 439/4 |
| 4,085,502 | 4/1978 | Ostman et al. | 29/843 |
| 4,163,134 | 7/1979 | Budrose | 200/505 |
| 4,166,241 | 8/1979 | Grant | 320/105 |
| 4,180,746 | 12/1979 | Giuffra | 307/127 |
| 4,217,534 | 8/1980 | Cole | 320/105 |
| 4,238,722 | 12/1980 | Ford | 320/105 |
| 4,272,142 | 6/1981 | Zapf | 439/504 |
| 4,286,172 | 8/1981 | Millonzi et al. | 307/10.1 |
| 4,349,774 | 9/1982 | Farque | 320/105 |
| 4,357,750 | 11/1982 | Ostman | 29/847 |
| 4,366,430 | 12/1982 | Wright | 439/504 |
| 4,386,818 | 6/1983 | Millhimes et al. | 439/490 |
| 4,420,212 | 12/1983 | Wright | 439/504 |
| 4,431,925 | 2/1984 | Frisbee et al. | 307/10.1 |
| 4,463,402 | 7/1984 | Cottrell | 361/77 |
| 4,488,147 | 12/1984 | Signorile | 340/636 |
| 4,527,111 | 7/1985 | Branham | 320/105 |
| 4,607,209 | 8/1986 | Guim et al. | 439/504 |
| 4,662,696 | 5/1987 | Asbury | 439/504 |
| 4,701,688 | 10/1987 | Guim | 320/105 |
| 4,721,479 | 1/1988 | Shuman | 439/503 |
| 4,757,250 | 7/1988 | Guim et al. | 320/105 |
| 4,769,586 | 9/1988 | Kazmierowicz | 320/105 |
| 4,781,629 | 11/1988 | Mize | 439/822 |
| 4,869,688 | 9/1989 | Merio | 439/504 |
| 4,871,957 | 10/1989 | Taranto et al. | 439/504 |
| 4,897,044 | 1/1990 | Rood | 355/52 |
| 4,906,205 | 3/1990 | Viles | 439/504 |
| 4,923,415 | 5/1990 | Lee | 439/755 |
| 4,934,957 | 6/1990 | Bellusci | 439/504 |
| 4,938,712 | 7/1990 | Black | 273/333 |
| 4,969,834 | 11/1990 | Johnson | 439/141 |
| 4,972,135 | 11/1990 | Bates et al. | 320/105 |
| 4,975,089 | 12/1990 | Lee | 439/755 |
| 5,030,106 | 7/1991 | Cameron et al. | 439/8 |
| 5,037,335 | 8/1991 | Campbell | 439/755 |
| 5,071,368 | 12/1991 | Garritano et al. | 439/504 |
| 5,111,130 | 5/1992 | Bates | 439/105 |
| 5,189,359 | 2/1993 | Kronberg | 439/103 |
| 5,230,637 | 7/1993 | Weber | 439/504 |
| 5,297,977 | 3/1994 | Lamper | 439/504 |
| 5,340,326 | 8/1994 | LeMaster | 439/207 |
| 5,367,243 | 11/1994 | Wells et al. | 320/105 |
| 5,435,759 | 7/1995 | Adams et al. | 439/755 |
| 5,601,452 | 2/1997 | Ruffa | 439/504 |

*Primary Examiner*—Neil Abrams
*Assistant Examiner*—T C Patel
*Attorney, Agent, or Firm*—Lane, Aitken & McCann

[57] ABSTRACT

A set of battery jumper cables includes a pair of single pole, single throw switches, or equivalent semiconductor implement switches. The switches are connected in series between the battery connection terminals of each cable in the set to prevent arcing. Control wires and a delay circuit connect the two terminals at one end of the set to the operating coil of one of the single pole switches. Similarly, another set of control wires and a delay circuit connect the terminals at the other end of the set to the operating coil of the other switch. In operation, these two switches in their unenergized state are open and automatically current flow through the cable set until after all four cable terminals are connected respectively to battery terminals and the relay delay has timed out, thus preventing arcing as the terminals are connected and disconnected or if the terminals at one end are shorted to each other. A pair of double pole, double throw, relay coil operated switches, or equivalent semiconductor implemented switches, automatically match the polarity of the battery terminals interconnected by the jumper cables. Because of the delay in closing the single pole switches, these double pole switches establish a proper polarity match before the single pole switches close.

6 Claims, 4 Drawing Sheets

JUMPER CABLES WITH AUTOMATIC SAFETY SWITCHING

BACKGROUND OF THE INVENTION

1. Field of the Invention

This invention relates to an improved set of cables, commonly referred to as jumper cables, for interconnecting a charging battery to a discharged battery. More particularly, the invention relates to a set of jumper cables that automatically insures the polarity of the connection is proper (i.e. positive terminal to positive terminal and negative to negative) and automatically prevents arcing during connection and disconnection.

2. Description of the Prior Art

Jumper cables are most often used to provide a charging current to a discharged car battery from another car battery. Often this operation is performed under conditions of stress and by persons with little or no experience. There are two primary problems in interconnecting two batteries with jumper cables. One is to make sure the polarity of the interconnected terminals is the same; that is, positive to positive and negative to negative. The other problem is arcing when the jumper cables are connected to or disconnected from battery terminals or when one end of the jumper cables is accidentally shorted after the other end has been connected.

Over a long period of years, there have been many proposals in the prior art attempting to solve one or the other of these problems associated with the use of jumper cables. However, these proposals have not proved to be altogether satisfactory because to solve both problems the prior art proposals require some user intervention. This means, in general, the user had to know how to take action, and/or when to take it. With the prior art proposals, if the user fails to properly follow the operating instructions, the cables either will not work or could be the cause of property damage or personal injury or both.

SUMMARY OF THE INVENTION

An object of this invention is the provision of a jumper cable set that completely automates every step of the polarity and terminal arcing protection processes, thus eliminating any need for user intervention, such as by operating a switch, pressing a button, plugging and unplugging connectors, or the like.

Briefly, this invention contemplates the provision of a set of battery jumper cables in which a pair of single pole, single throw switches, or equivalent semiconductor implement switches, is connected in series between the battery connection terminals of each cable in the set to prevent arcing. Control wires and a delay circuit connect the two terminals at one end of the set to the operating coil of one of the single pole switches. Similarly, another set of control wires and a delay circuit connect the terminals at the other end of the set to the operating coil of the other switch. In operation, these two switches in their unenergized state are open and automatically prevent current flow through the cable set until after all four cable terminals are connected respectively to battery terminals and the relay delay has timed out, thus preventing arcing as the terminals are connected and disconnected or if the terminals at one end are shorted to each other.

A pair of double pole, double throw, relay coil operated switches, or equivalent semiconductor implemented switches, automatically match the polarity of the battery terminals interconnected by the jumper cables. Because of the delay in closing the single pole switches, these double pole switches establish a proper polarity match before the single pole switches close.

BRIEF DESCRIPTION OF THE DRAWINGS

The foregoing and other objects, aspects and advantages will be better understood from the following detailed description of a preferred embodiment of the invention, in which like reference numerals are used to designate like parts in the various views, and in which:

FIG. 3 is a schematic diagram of an embodiment similar to

FIG. 2 but omitting the polarity correction apparatus shown in that Figure.

DETAILED DESCRIPTION OF A PREFERRED EMBODIMENT

Figure 1:
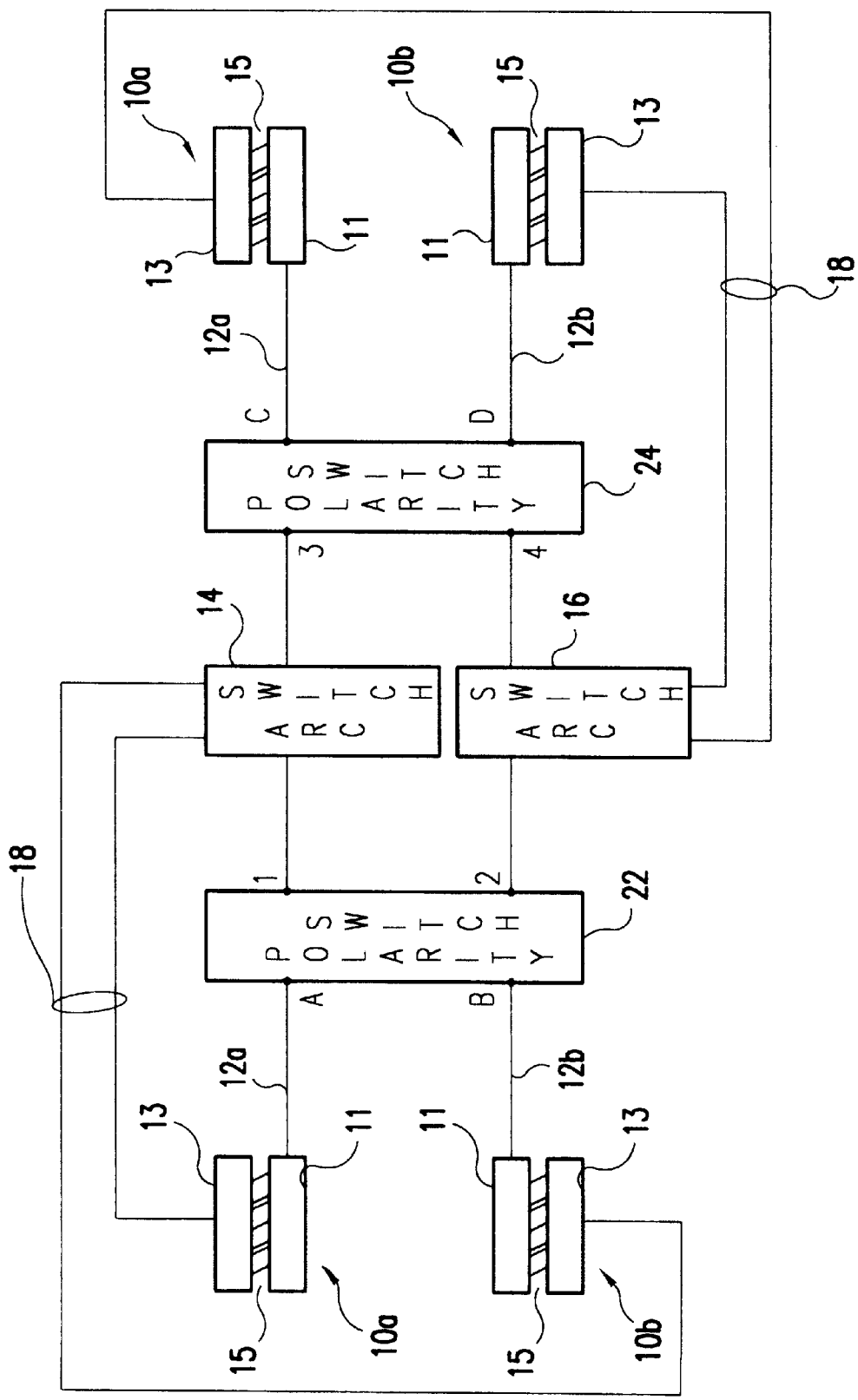
FIG. 1 is a block diagram of a jumper cable set which includes automatic polarity correction and automatic arc prevention in accordance with the teachings of this invention.
Figure 5:
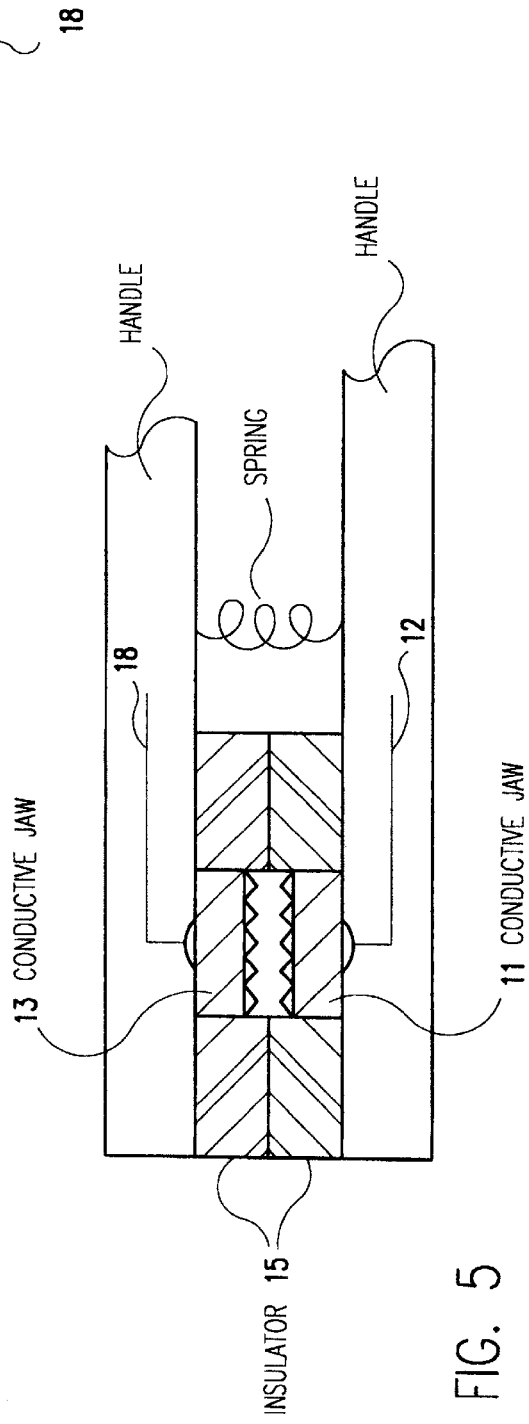
FIG. 5 is a schematic view of one embodiment of a jumper cable connector.

Referring now to FIGS. 1 and 5, the functional components of a jumper cable set in accordance with the teachings of the invention. As in conventional jumper cable sets, this set includes, at each end of wires 12, a pair of connectors 10 for connection to battery terminals. Wires 12 are capable of conducting a relatively heavy current. The connectors may be of any suitable two part design, such as spring loaded jaw clamps, as illustrated in FIG. 5. One side 11 of each connector is connected to a cower wire 12. The other side 13 of each connection is connected to a control wire 18 that operates the single pole switches. The two sides of each connector 10 should be electrically insulated from one another, when the connectors are not in contact with a battery terminal as indicated schematically by insulator 15. Although each connector and wire of the pair is usually the same as the other, for ease of explanation the top wire in the drawing is denoted 12a, the lower wire 12b, the upper connectors 10a, and the lower connectors 10b.

A single pole, single throw, relay operated switch 14, or an equivalent semiconductor implemented switch, is connected in series in the upper wire 12a between the upper connectors 10a. Similarly, a single pole, single throw, relay operated switch 16, or an equivalent semiconductor implemented switching function, is connected in series in the lower wire 12b between the lower connectors 10b. A control wire pair 18 connects the relay coil of switch 14 across the terminals 10a and 10b on the left hand side of the drawing and a control wire pair 18 connects the relay coil of switch 16 across the terminals 10a and 10b on the right hand side. The control wires 18 need be only heavy enough to safely carry the relay coil operating current of switches 14 and 16, which current is small relative to the typical battery charging current. These switches 14 and 16, in combination, automatically prevent current flow in the wires 12a and 12b until all the clamps 10 have been connected to battery terminals.

Two double pole, double throw, relay operated switches 22 and 24 or equivalent semiconductor implemented switches, automatically insure that She positive terminal of one battery is connected to the positive terminal of the other battery and their negative terminals are likewise connected together. The inputs to switch 22 are labled A and B and the outputs of the switch are labled 1 and 2. Similarly, the inputs to switch 24 are labled C and D and the outputs are labled 3 and 4. A section of the cable 12a that includes relay switch 14 connects output terminal 1 of switch 22 to output terminal 3 of switch 24 and the section of cable that includes switch 16 connects output terminal 2 to output terminal 4. The switches 22 and 24 operate automatically so that the polarity of their respective outputs is always the same regardless of the polarity of the inputs to the switches. For example, the interconnected outputs 1 and 3 are always positive and the interconnected outputs 2 and 4 are always negative irrespective of the polarities of A,B,C and D.

Figure 2:
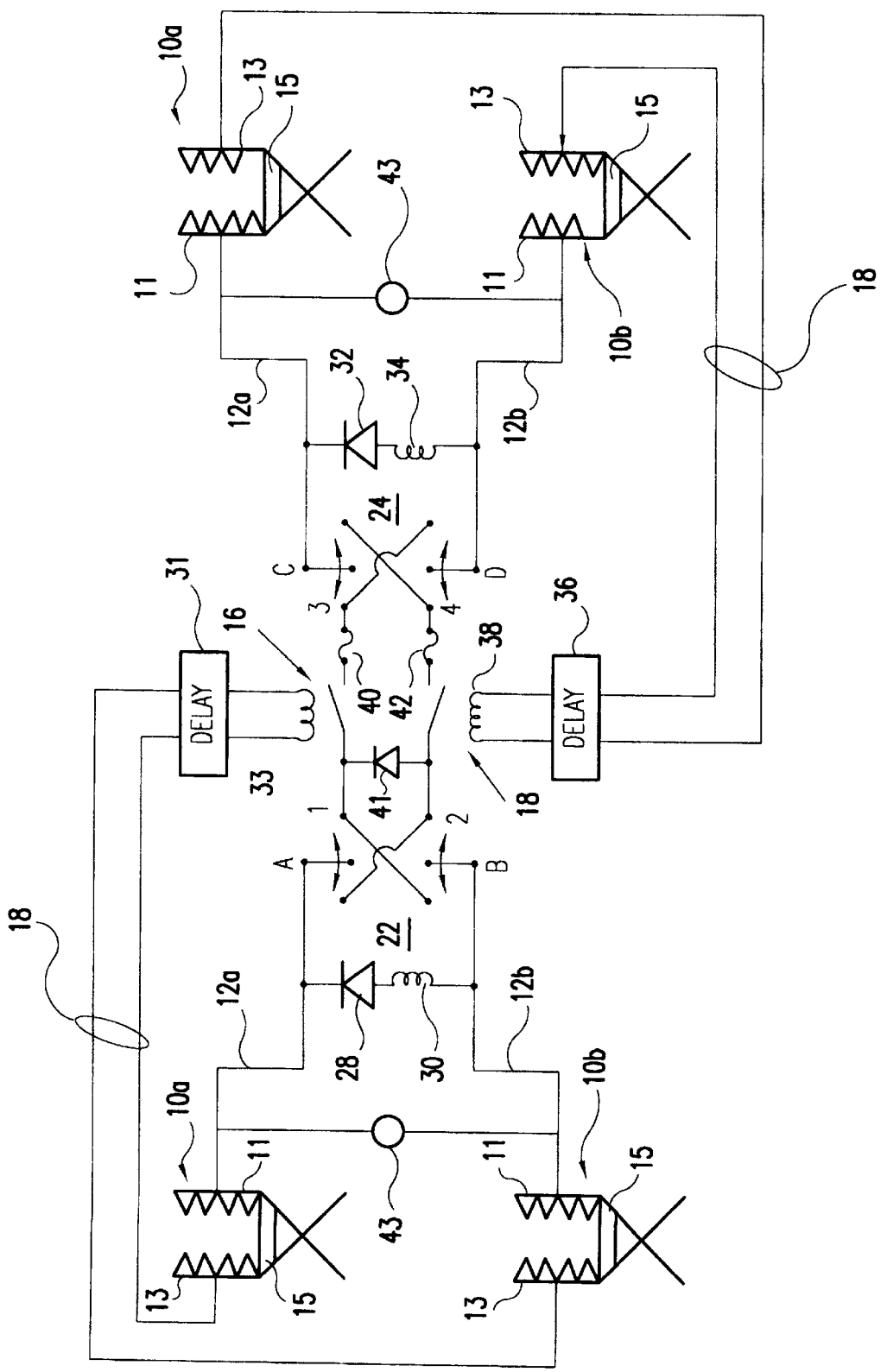
FIG. 2 is a schematic diagram of one specific embodiment of the invention shown in block diagram form in FIG. 1.

FIG. 2 is a schematic diagram of the jumper cable set shown in FIG. 1 with the switches implemented as mechanical, relay operated switches. Of course, the switching functions described could be implemented in semiconductor technology. A diode 28 connects the operating coil 30 of relay switch 22 between terminals 10a and 10b on the left hand side of the drawing. Similarly, a diode 32 connects the operating coil 34 of relay switch 24 between the terminals 10a and 10b on the right hand side of the drawing. In this exemplary embodiment, because of the diode, the coil 30 is energized only when the input to the switch terminal B of switch 22 is positive. In this case, the switch 22 connects input B (i.e. terminal 10b) to switch output 1 and input A (i.e terminal 10a) to switch output 2. Otherwise, when the input to terminal A is positive, the coil 30 is not energized and switch 22 connects input A to switch output 1 and input B to switch output 2. As can be seen in FIG. 2, the circuit comprising switch 24 and its operation is the same as that just described in connection with switch 22 and need not be repeated in detail. In this exemplary embodiment, switch outputs 1 and 3 are positive and switch outputs 2 and 4 are negative irrespective of the polarity of the battery terminals to which connectors 10a and 10b are connected.

The pair of control wires 18 connect, via a delay circuit 31, the coil 33 of switch 16 across the left hand cable terminals 10a and 10b. The delay circuit 31 may be any suitable delay circuit, such as a commercially available thermal delay switch. This delay prevents the switch 16 from closing after cable terminals 10a and 10b have been connected to the battery terminals until after switch 22 establishes the designed polarity at its output terminals 1 and 2. Similarly, the pair of control wires 18 connect, via a delay circuit 36, the right hand cable terminals 10a and 10b to the coil 38 of switch 18. Again, the delay introduced by circuit 36 allows time for the switch 24 to establish the designed polarity at its output terminals 3 and 4 before switch 18 closes. Switches 16 and 18 in combination prevent current from flowing before all the cable terminals are connected to battery terminals. When a cable terminal is disconnected from its battery terminal, the coil of the switch 16 or 18 connected to that cable quickly opens, preventing further current flow. Fuses 40 and 42 prevent excessive current flow in the event a cable terminal from one end is shorted to a cable terminal at the other end. The pull-in voltage of the double pole, double throw relay switches 22 and 24 should be less than the pull-in voltage of the single pole, single throw relays 16 and 18. This insures that the polarity correction will be made, if necessary, when the single pole, single throw relay is closed.

Figure 3:
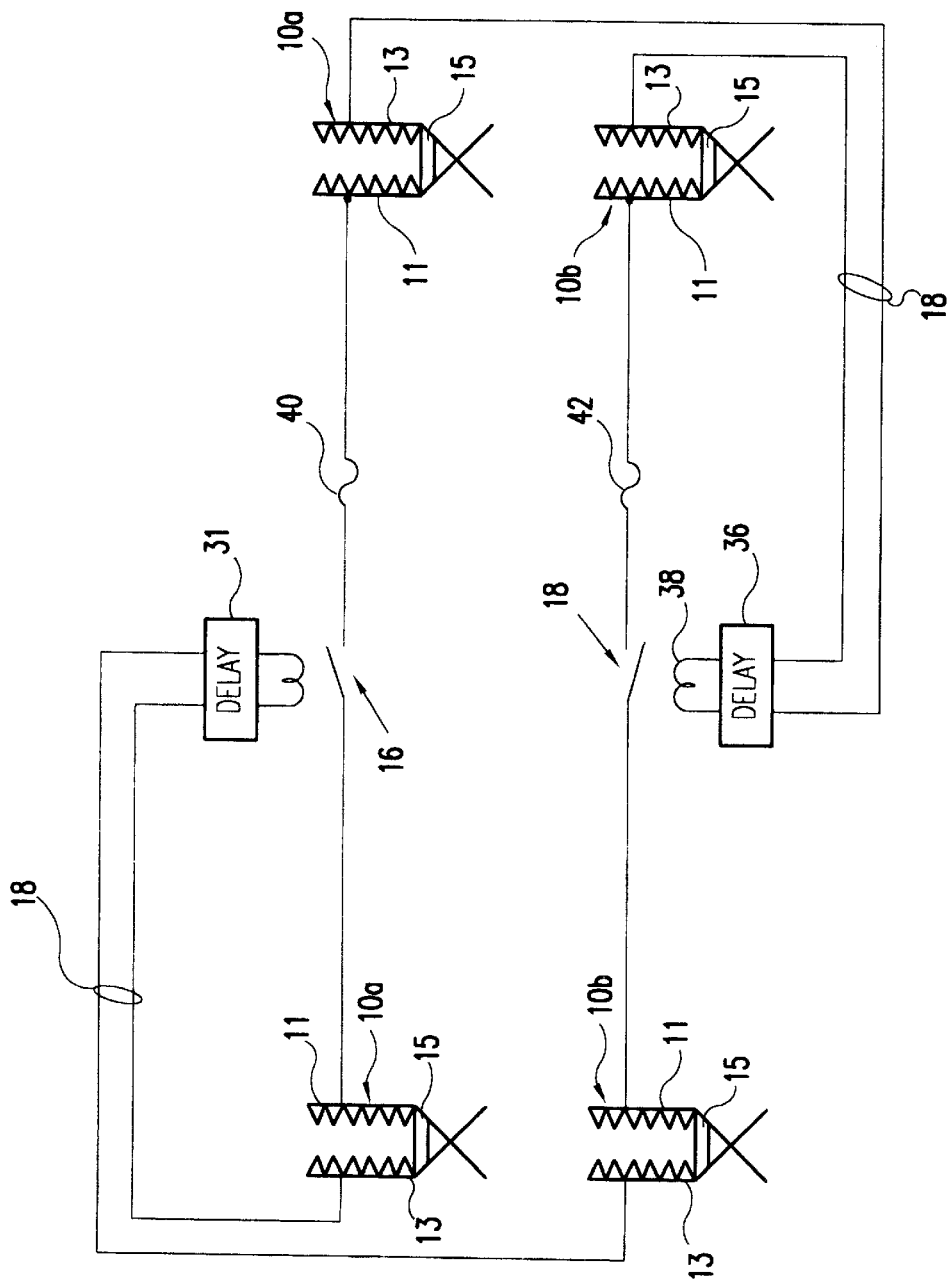
Figure 4:
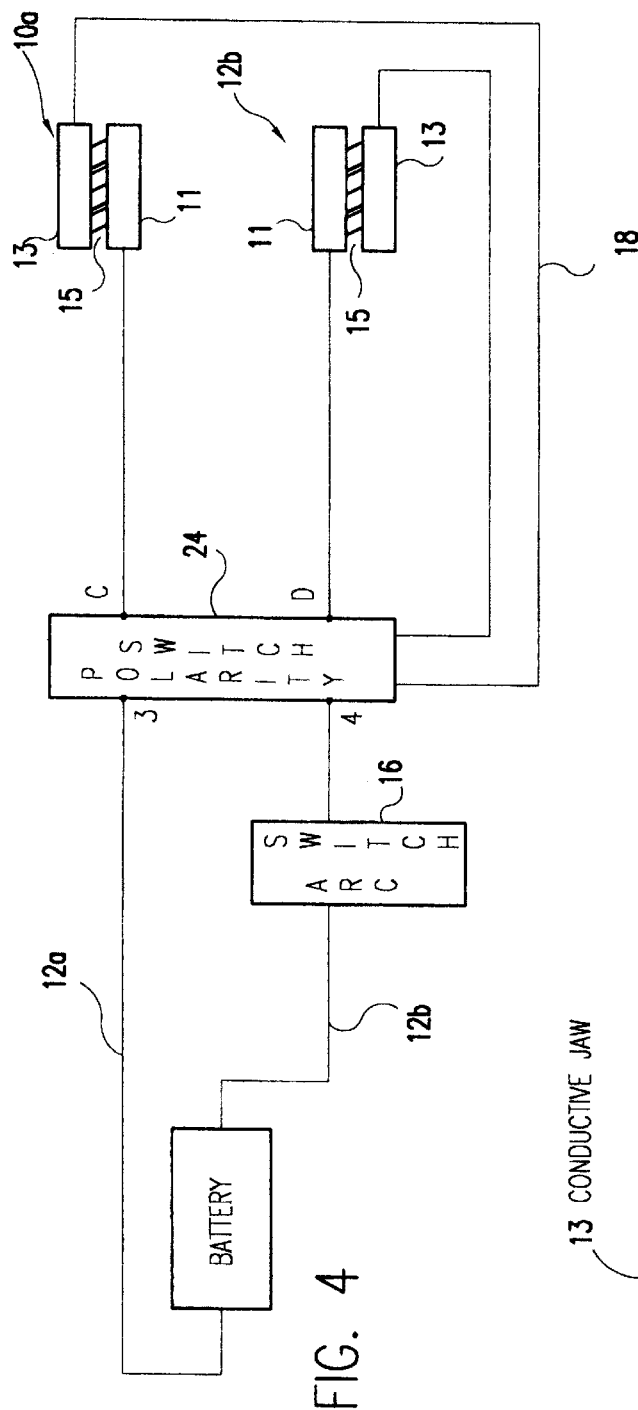
FIG. 4 is a schematic diagram of an embodiment similar to FIG. 2 showing the teachings of the invention applied to a charging system that includes as a port thereof a charging current source.

FIG. 4 shows the application of the teachings of the invention to a battery charging system which includes as a component a charging current source 50. In the system illustrated, the wires 12a and 12b on the left hand side of the drawing are "hard wired" to the source 50 (e.g. a battery) so that the polarity of 12a and 12b is known and switch 22 is unnecessary. Similarly, 12a and 12b are always connected to source 50 so that switch 16 is likewise eliminated. The system of FIG. 4 and its operation is the same as that shown and explained in connection with FIGS. 1–3 with respect to the charging battery.

Thus it can be appreciated that the objects of the invention have been met. The instant invention overcomes the problem of requiring the user to press a button, move a switch, plug/unplug connectors, etc. By completely automating every process of protection, one has a set of battery cables that are safe to use. This invention uses very few components which are inexpensive to manufacture. The invention can use switches 16 and 18 only for spark suppression and short circuit protection if desired, as shown in FIG. 3.

This invention separates the circuit path for high current voltage flow for the purpose of "jumping" two batteries together from the control circuit that completes the final connection between the batteries. This control circuitry includes a delay on "make" with an "instant" break. Both are necessary for creating cables that are safe, have spark elimination and are short circuit proof.

The invention uses a battery terminal clamp that keeps both circuits (jumping and control) isolated from one another. This can be achieved in a number of ways, for example:

1. Two metal "jaws" attached to an insulated clamping handle.
2. Independent connection using a "micro" type switch.
3. Independent connection using a pressure type connection.

Polarity detection and correction is performed with a commercially available double pole, double throw relay. The diode placed in series with the relay's coil provides that the relay operates only when necessary to perform polarity reversal. LED 41 can be added to give a visual indication that the cables are working properly. "Flashlight" type 43 and reflectors could be added to give the user a handy light source. The circuitry should/could be housed in a box/cylinder between the cable ends but not necessarily in the exact center. Cable clamps could be of various designs: spring loaded, screw tightener, sliding wedge, etc. Cable wires would be a single cable with two conductors insulated from one another. Relay coils would operate on a wide voltage range so that they would properly engage with a weak battery. Relay contacts would be heavy enough to carry the charging current but would not have to switch heavy loads. Capacitors may be applied across the relay contacts to help suppress sparking and protect them.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A jumper cable apparatus for automatically connecting the positive terminal of a first battery to the positive terminal of a second battery and for connecting the negative terminal of the first battery to the negative terminal of the second battery, and for automatically preventing arcing, comprising in combination:

said jumper cable apparatus having a first pair of connectors for connecting to a pair of terminals of said first battery and a second pair of connectors for connecting to a pair of terminals of said second battery;

each of said connectors including two contacts electrically insulated from one another with a control wire connected to one of said contacts and a charging wire connected to the other of said contacts;

a first switch connecting via charging wire one of said pair of terminals of said first battery to one of said pair of terminals of said second battery;

a second switch connecting via charging wire the other of said pair of terminals of said first battery to the other of said pair of terminals of said second battery;

said first switch being connected to said first pair of connectors by control wires and a delay circuit so that the switch is closed after both of said first pair of connectors terminals are connected to said pair of terminals of said first battery; and said second switch being connected to said second pair of connectors by control wires and a delay circuit so that the switch is closed after both of said second pair of connectors are connected to said pair of terminals of said second battery.

2. A jumper cable apparatus for automatically connecting the positive terminal of a first battery to the positive terminal of a second battery and for connecting the negative terminal of the first battery to the negative terminal of the second battery, and for automatically preventing arcing, comprising in combination:

said jumper cable apparatus having a first pair of connectors for connecting to a pair of terminals of said first battery and a second pair of connectors for connecting to a pair of terminals of said second battery;

a first switch having a pair of output terminals and a pair input terminals connected to said first pair of connectors;

a second switch having a pair of output terminals and a pair of input terminals connected to said second pair of connectors;

a third switch connecting a first output terminal of said first switch to a first output terminal of said second switch;

a fourth switch connecting a second output terminal of said first switch to a second output terminal of said second switch;

the input terminals of said first switch connected to said first pair of connectors and performing a switching operation so that the polarity of the voltage at the output terminals of the switch is independent of the polarity of the voltage at the input terminals;

the input terminals of said second switch connected to said second pair of connectors and performing a switching operation so that the polarity of the voltage at the output terminals of the switch is independent of the polarity of the voltage at the input terminals;

said third switch being connected to said first pair of connectors so that the switch is closed when both of said first pair of connectors are connected to said pair of terminals of said first battery; and said fourth switch being connected to said second pair of connectors so that the switch is closed when both of said second pair of connecting terminals are connected to said pair of terminals of said second battery.

3. A jumper cable apparatus for automatically connecting the positive terminal of a first battery to the positive terminal of a second battery and for connecting the negative terminal of the first battery to the negative terminal of the second battery, and for automatically preventing arcing, comprising in combination:

said jumper cable apparatus having a first pair of connectors for connecting to a pair of terminals of said first battery and a second pair of connectors for connecting to a pair of terminals of said second battery;

a first single pole, single throw, relay coil operated switch connecting one of the pair of terminals of said first battery to one of the pair of terminals of said second battery;

a second single pole, single throw, relay coil operated switch connecting the other of the pair of terminals of said first battery to the other of the pair of terminals of the second battery;

the relay operating coil of said first single pole, single throw, relay coil operated switch being connected to said first pair of connectors so that the switch is closed when both of said first pair of connectors are connected to the pair of terminals of said first battery; and the relay operating coil of said second single pole, single throw, relay coil operated switch being connected to said second pair of connectors so that the switch is closed when both of said second pair of connectors are connected to the pair of terminals of said second battery.

4. A jumper cable apparatus as in claim 3 wherein a first air of control wires and a delay circuit connect the relay operating coil of said first single pole, single throw, relay coil operator switch to said first pair of connectors and a second pair of control wires and a delay circuit connect the relay operating coil of said second single pole, single throw, relay coil operator switch to said second pair of connectors.

5. A jumper cable apparatus for automatically connecting the positive terminal of a first battery to the positive terminal of a second battery and for connecting the negative terminal of the first battery to the negative terminal of the second battery, and for automatically preventing arcing, comprising in combination:

said jumper cable apparatus having a first pair of connectors for connecting to a pair of terminals of said first battery and a second pair of connectors for connecting to a pair of terminals of said second battery;

a first double pole, double throw, relay coil operated switch having a pair of outputs and a pair of input connected to said first pair of connectors;

a second double pole, double throw, relay coil operated switch having a pair of outputs and a pair of inputs connected to said second pair of connectors;

a first single pole, single throw, relay coil operated switch connecting a first output of said first double pole, double throw, relay coil operated switch to a first output of said second double pole, double throw, relay coil operated switch;

a second single pole, single throw, relay coil operated switch connecting a second output of said first double pole, double throw, relay coil operated switch to a second output of said second double pole, double throw, relay coil operated switch;

the inputs of said first double pole, double throw, relay coil operated switch connected to said first pair of connectors and the inputs of said second double pole, double throw, relay coil operated switch connected to said second pair of connectors;

the relay operating coil of said first double pole, double throw, relay coil operated switch connected to said first pair of connectors and performing a switching operation so that the polarity of the voltage at the outputs of the switch is independent of the polarity of the voltage at the inputs;

the relay operating coil of said second double pole, double throw, relay coil operated switch connected to said second pair of connectors and performing a switching operation so that the polarity of the voltage at the outputs of the switch is independent of the polarity of the voltage at the inputs;

the relay operating coil of said first single pole, single throw, relay coil operated switch being connected to said first pair of connectors so that the switch is closed when both of said first pair of connectors are connected to said pair of terminals of said first battery; and the relay operating coil of said second single pole, single throw, relay coil operated switch being connected to said second pair of connectors so that the switch is closed when both of said second pair of connectors are connected to the pair of terminals of said second battery.

6. A jumper cable apparatus as in claim 2 wherein a first pair of control wires and a delay circuit connect said third switch to said first pair of connectors and a second pair of control wires and a delay circuit connect said fourth switch to said second pair of connectors.

* * * * *